United States Patent
Kempf

[11] Patent Number: 5,957,499
[45] Date of Patent: Sep. 28, 1999

[54] SEAT BELT FOR VEHICLE SEATS

[75] Inventor: Juergen Kempf, Herrenberg, Germany

[73] Assignee: Daimler-Benz Aktiengesellschaft, Germany

[21] Appl. No.: 08/951,420

[22] Filed: Oct. 16, 1997

[30] Foreign Application Priority Data

Oct. 16, 1996 [DE] Germany .............. 196 42 689

[51] Int. Cl.⁶ ................................................. B60R 22/00
[52] U.S. Cl. ......................................... 280/801.1; 297/481
[58] Field of Search ........................ 280/801.1, 808; 297/481, 468, 483

[56] References Cited

U.S. PATENT DOCUMENTS 4,057,290  11/1977  Arima ........................................ 297/481

FOREIGN PATENT DOCUMENTS 0 494 009 B1  7/1992  European Pat. Off. .
18 48 835  10/1961  Germany .
26 38 272  7/1977  Germany .

*Primary Examiner*—Paul N. Dickson
*Attorney, Agent, or Firm*—Evenson, McKeown, Edwards & Lenahan, P.L.L.C.

[57] ABSTRACT

The invention relates to a seat belt for vehicle seats with a webbing secured endwise at anchoring points in the vehicle, said webbing assuming a storage position when the seat is unoccupied, and with a tongue displaceable on the webbing within a webbing segment, said tongue being secured in a belted-in position by inserting it in a belt buckle integral with the vehicle when the seat is occupied. To ensure a favorable gripping position for the tongue in the storage position of the seat belt and to avoid rattling noises caused by the tongue against parts of the body, a pocket for inserting the tongue is disposed on the webbing in an area that is readily accessible to a seat occupant when the webbing is in the stored position.

10 Claims, 3 Drawing Sheets

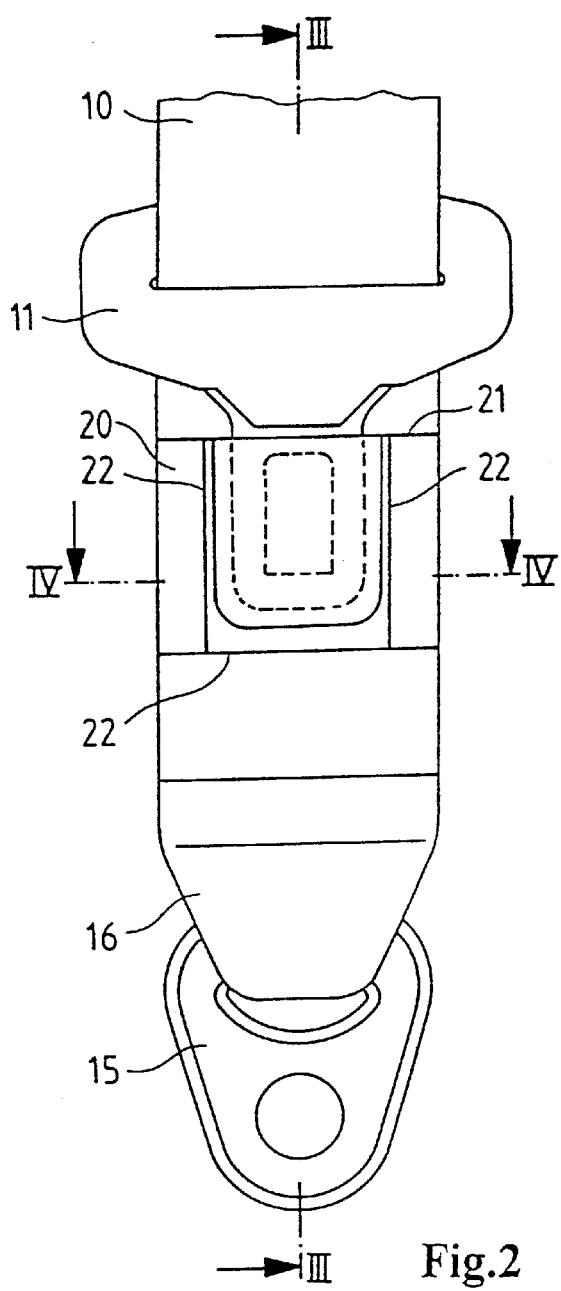
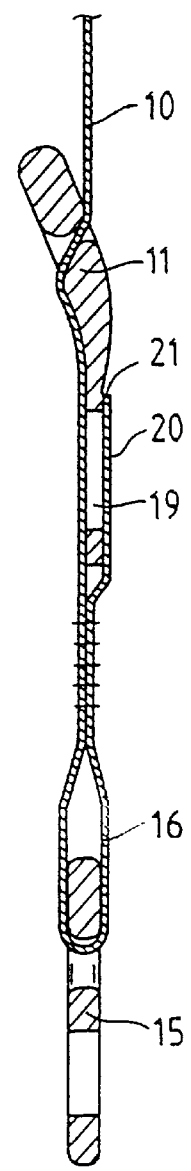
Fig.2    Fig.3
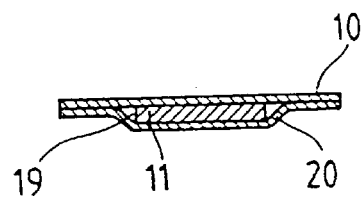
Fig.4

_5,957,499_

SEAT BELT FOR VEHICLE SEATS

BACKGROUND AND SUMMARY OF THE INVENTION

This application claims the priority of Germany Application No. 19642689.8, filed Oct. 16, 1997, the disclosure of which is expressly incorporated by reference herein.

The invention relates to a vehicle seat belt.

In so-called three-point seat belts for single seats in automobiles, the webbing is fastened at one end to a retractor anchored to the B pillar of the vehicle body, guided over a deflecting fitting fastened to the B pillar above the shoulder of the seat user, and anchored at its other end by an end fitting to the foot of the B pillar or to the body floor. The tongue that divides the seat belt in the buckled-up position into a shoulder belt and lap belt is inserted into a belt buckle fastened on the seat side facing away from the B pillar to the vehicle floor or to the seat base. In the stored position, the webbing is wound up by the retractor so that it is stretched tightly between the retractor, deflecting fitting, and foot anchoring. The other end of the buckle is then located somewhere on the portion of the webbing delimited by the foot anchoring point and the deflecting fitting. A button clipped onto that portion of the webbing prevents the tongue from slipping downward, thus also limiting the possible positions of the tongue in the stored position. To put on the seat belt, the seat user, after taking his place on the vehicle seat, must grip the tongue and use it to pull the webbing out of the retractor until it can be inserted into the belt buckle. However, when the seat belt webbing is in the fully rolled up position, the tongue occupies a random position on the portion of the webbing between the deflecting fitting and the foot anchoring point. Thus, putting on the belt or buckling up is preceded by a search for the tongue of the buckle.

To avoid this, in a known seat belt of the type recited at the outset (DE 26 38 272 A1) a slider made of plastic with a suitable frictional seat is mounted so that it can slide on the webbing. The slider has an eye through which the webbing is pulled by force, and a slot into which the tongue can be inserted. The slider prevents the tongue from slipping down to the end fitting at the anchoring point on the vehicle side, and also makes it possible, by inserting the tongue, to secure the tongue in a specific area where it is easy to grasp. In this way it can be assured that the belt user will always find it at the same place.

However, a slider of this kind is relatively large and takes up considerable space on the webbing so that it can be a considerable annoyance when using the belt. In the stored position, the end projects from the webbing for a distance and is largely exposed so that depending on its position in the storage location, it can rattle against the vehicle body.

In another known two-point seat belt (DE 18 48 835 U1), near the upper mounting end of the webbing, a clasp with a hook is slid onto the webbing and the free end of the webbing is attached to the hook with an eye provided for the purpose at that location. A leaf spring that covers the hook opening prevents the eye from inadvertently slipping out of the hook.

In seat belts for minivans with bench seats (EP 0 494 009 B1), in a seat belt for the middle and outer seats of the bench seat that are remote from the side walls, one anchoring location for one end of the webbing is formed by a retractor that is mounted on the roof frame and covered by the roof frame lining. The other anchoring point is formed by a receptacle that consists of an end fitting fastened to the webbing, and a locking device for the end fitting that is integral with the vehicle. In the storage position, the end fitting is secured in a fastening device integrated into the roof frame lining, so that the webbing does not project in a disturbing fashion into the interior space. The other end rests against the roof frame lining, which causes rattling sounds on rough roads.

The object of the invention is to provide an improved seat belt of the type recited at the outset for which, in the belt storage position, the tongue is always located at a specific position on the webbing where it can be easily gripped by the belt user.

Another object of the invention is to provide such a seat belt in which no rattling noises are caused by the tongue, not even when using the seat belts for the middle and outer seats of a bench seat in minivans, for which case the webbing is anchored in the roof frame lining in the belt storage position.

These and other objects and advantages are achieved by the vehicle seat belt according to the invention, which includes a pocket formed by a material strip on the webbing itself and having an opening for insertion of the tongue. By inserting the tongue into the pocket, not only does the seat user always find the tongue in the storage position at a point where it is easy to grasp, and thus can put on the seat belt without considerable preparation, but rattling noises caused by impact between the tongue and the roof frame lining or other parts of the body is reliably eliminated. The pocket formed by applying a preferably fabric material section covers the tongue for the most part so that it cannot strike anything. The pocket is extremely flat since its rear wall is formed by the webbing itself and takes up extremely little space on the webbing so that it does not produce any problems when the belt is in use. Because the tongue is nearly completely inserted into the pocket in the belt storage position, the pocket produces an aesthetically appealing appearance for the seat belt.

According to a preferred embodiment of the invention, in a seat belt for a seat remote from the wall in a minivan with a roof frame lining, the pocket is formed at the end of the seat belt that preferably has an end fitting to anchor the webbing firmly endwise to the vehicle. A portion of the webbing is folded over the webbing loop and is sewn on three sides to the webbing. It is not sewn, however, at the transverse end edge of the seat belt portion facing away from the end fitting, to form the pocket opening. Instead of sewing, another known form of fastening may be used as well.

Other objects, advantages and novel features of the present invention will become apparent from the following detailed description of the invention when considered in conjunction with the accompanying drawings.

BRIEF DESCRIPTION OF THE DRAWINGS

FIG. 2 shows portions of a top view of the seat belt in FIG. 1.

FIG. 3 shows a section along line III—III in FIG. 2;

FIG. 4 shows a section along line IV—IV in FIG. 2;

DETAILED DESCRIPTION OF THE DRAWINGS

Figure 1:
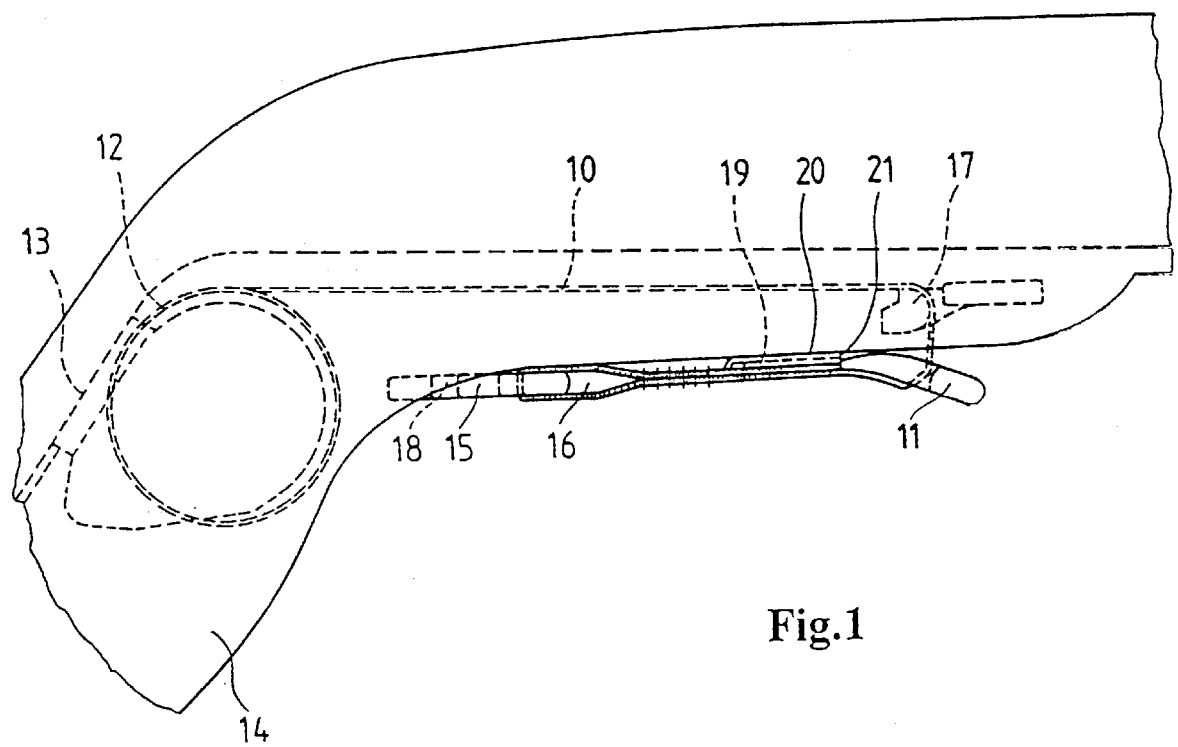
FIG. 1 shows portions of a roof frame of a vehicle body with a seat belt in the storage position.

FIG. 2 is a top view, and FIGS. 3 and 4 are various sectional views of a seat belt, for a bench seat remote from the side walls of a minivan. FIG. 1 is a side view which shows the seat belt in its storage position in the minivan. The webbing 10 of the seat belt is secured endwise at two anchoring points at the vehicle seats, and has a tongue 11 displaceable thereon. In the buckled-up position of the seat belt, the tongue is inserted into a buckle which is integral with the vehicle (not shown), and which is located close to the seat surface of the seat on the side of the seat facing away from the other two anchoring points. When tongue 11 is inserted into the buckle, the seat belt is anchored at three points to the vehicle body, while webbing 10 is divided by tongue 11 into a so-called shoulder belt portion and a so-called lap belt portion, in known fashion.

At one anchoring point of webbing 10, the webbing end is wound on a retractor 12 fastened to roof frame 13 of the minivan (FIG. 1). A roof frame lining 14 that covers the roof frame also covers retractor 12. At the other anchoring point of webbing 10, an end fitting 15, in the form of a smaller tongue for example, is received in a fixed webbing loop 16 that is releasably secured in a fastening device integral with the vehicle, at or near the floor of the body or the seat of the minivan. Between the two anchoring points, the webbing is guided over a deflecting fitting 17, which is fastened to roof frame 13 inside roof frame lining 14. Tongue 11 is located displaceably on the webbing section that is limited by end fitting 15 and deflecting fitting 17. In the storage position of the seat belt shown in FIG. 1, end fitting 15 is released from the fastening device integral with the vehicle (at or near the floor of the body or the seat) and inserted into an insertion opening 18 provided in roof frame lining 14, with the excess length of webbing being wound up by retractor 12. A storage device can also be provided in insertion opening 19 so that deflecting fitting 17 cannot be pulled out from insertion opening 18 by the spring force of retractor 12.

For specific as well as rattle-free positioning of tongue 11 in the storage position of the seat belt, a pocket 19 is formed for insertion of tongue 11 at the end of webbing loop 16 that receives end fitting 15. As shown in FIGS. 1 to 3, this pocket 19 is formed by folding end segment 20 against webbing loop 6 and sewing or gluing it along three side edges to adjacent webbing 10, with only transverse end edge 21, facing away from end fitting 15, of webbing end segment 20 remaining unsewn. The seams or adhesive connections in FIG. 2 are indicated schematically by 22.

Figure 5:
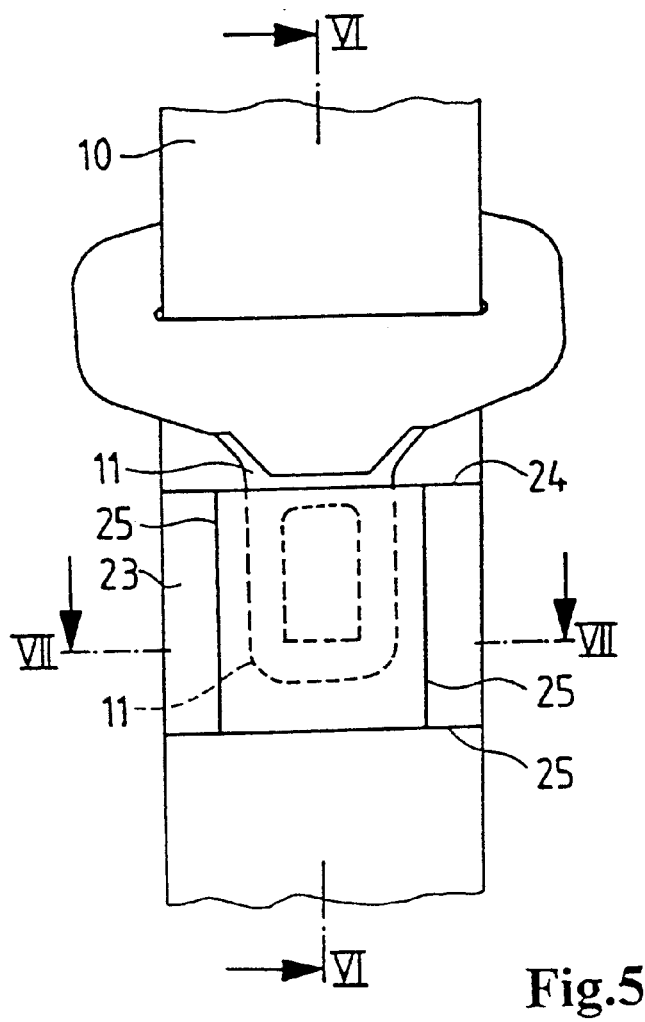
FIG. 5 shows sections of a top view of a seat belt according to another embodiment.
Figure 6:
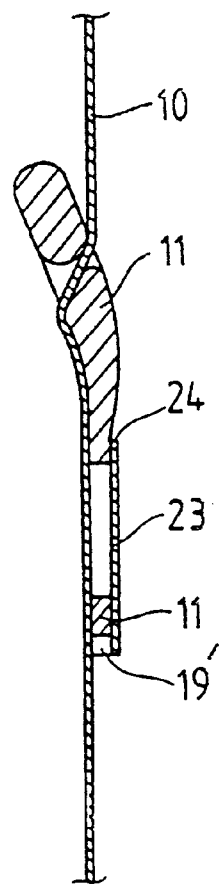
FIG. 6 shows a section along line VI—VI in FIG. 5.
Figure 7:
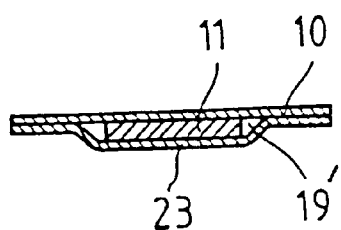
FIG. 7 shows a section along line VII—VII in FIG. 5.

In FIGS. 5–7, a three-point seat belt for a single seat of a vehicle is shown in sections, in its storage position. The retractor is generally secured to the B-pillar (not shown) and the webbing is guided over a deflecting fitting located on the B-pillar above the shoulder of the seat occupant. In the storage position, webbing 10 is stretched tightly between the anchoring point, located near the floor, of one end of the webbing and the deflecting fitting, with tongue 11 being displaceably received in this webbing section.

In known seat belts, a button is clipped on webbing 10 at a distance from the deflecting fitting to prevent the tongue 11 from slipping down to the lower anchoring point. Thus, in the storage position, tongue 11 is always to be found in a reduced segment of the webbing between the deflecting fitting and the button.

In the seat belt shown in FIGS. 5–7, this button is eliminated and instead a pocket 19' for insertion of tongue 11 is provided on webbing 10. Pocket 19' is thus formed by placing a segment of material 23 on webbing 10 and sewing or gluing along three lateral edges to webbing 10, leaving unsewn or not glued only the upper transverse end 24 that extends transversely to the lengthwise axis of the webbing.

The seams or adhesive connections are marked 25 in FIG. 5. Material segment 23 is preferably made of the same material as webbing 10, but can also be made of leather or fabric. In the storage position, tongue 11 is inserted from above into pocket 19' and is thus positioned securely and conveniently.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A seat belt for a seat of a vehicle comprising:
    a webbing adapted to be fastened endwise in anchoring points on the vehicle, said webbing assuming a storage position when the seat is unoccupied;
    a latching tongue displaceable on the webbing, said webbing being adapted to be secured in a belted-in position by inserting said tongue into a buckle integral with the vehicle; and
    a pocket formed on said webbing for securing said tongue in a storage position on the webbing that is easily accessible when the webbing is in the storage position; said pocket comprising a segment of webbing material which is joined to the webbing at a periphery thereof, with an opening for insertion of said tongue, the pocket thereby being formed between the webbing and the segment of webbing material.

2. The seat belt according to claim 1, wherein the segment of webbing material is joined along three side edges to the webbing.

3. The seat belt according to claim 2, wherein the segment of webbing material is fastened to the webbing by one of sewing, gluing and welding.

4. The seat belt according to claim 2, wherein one of two transverse edges of the segment of webbing material remains unfastened to form the pocket opening.

5. The seat belt according to claim 1, for a seat located remotely from a side wall in a minivan with a roof frame lining, wherein:
    one endwise anchoring point integral with the vehicle for the webbing has an end fitting received in a loop formed at an end of the webbing, said fitting being in the form of a second latching tongue which is releasably receivable in a fastening device integral with the vehicle, and is accommodated at least partially in the storage position in a roof frame lining; and
    the pocket is formed at the end of the webbing loop.

6. The seat belt according to claim 5, wherein an end segment of the webbing is folded to form said loop.

7. The seat belt according to claim 6, wherein a transverse end edge of the webbing end segment remains unfastened, forming the pocket opening.

8. A seat belt for a vehicle seat comprising:
    an elongate webbing adapted to be fastened at opposite ends thereof at anchoring points on a vehicle;
    a latching tongue which is displaceable on said webbing, and is insertable into a buckle which is integral with the vehicle, whereby said webbing is secured in a belted position when said vehicle seat is occupied; and
    a pocket formed on said webbing for holding said tongue in a predetermined accessible storage position when said seat belt is not in use;
        said pocket comprising a segment of webbing material which is joined to the webbing at a periphery thereof, with a transverse opening for insertion of said tongue, the pocket thereby being formed between the webbing and the segment of webbing material.

9. The seat belt according to claim 8, wherein said segment of webbing material is joined to said webbing along three sides thereof, a fourth side thereof remaining unfastened and forming said transverse opening.

10. The seat belt according to claim 9, wherein said segment of webbing material comprises an end portion of said webbing.

* * * * *